US007143845B2

(12) United States Patent
Leppanen

(10) Patent No.: US 7,143,845 B2
(45) Date of Patent: Dec. 5, 2006

(54) DRILLING APPARATUS WITH ANTI-VIBRATION INERTIAL BODY

(75) Inventor: Jarmo Leppanen, Gainesville, FL (US)

(73) Assignee: Sandvik Intellectual Property AB, Sandviken (SE)

( * ) Notice: Subject to any disclaimer, the term of this patent is extended or adjusted under 35 U.S.C. 154(b) by 0 days.

(21) Appl. No.: 10/702,730

(22) Filed: Nov. 7, 2003

(65) Prior Publication Data

US 2005/0098354 A1 May 12, 2005

(51) Int. Cl.
*E21B 3/02* (2006.01)
*F16F 15/315* (2006.01)

(52) U.S. Cl. ...................... 175/162; 175/122; 175/203; 74/572.21; 74/572.2; 464/182; 403/359.1; 173/162.1

(58) Field of Classification Search ................ 175/162, 175/203, 122; 464/182; 173/162.1; 403/359.1; 74/414, 572, 574, 572.21, 572.2
See application file for complete search history.

(56) References Cited

U.S. PATENT DOCUMENTS

| | | | | |
|---|---|---|---|---|
| 2,879,034 | A * | 3/1959 | Cowan | 173/31 |
| 3,534,636 | A * | 10/1970 | Lorence | 475/177 |
| 4,270,410 | A * | 6/1981 | Herscovici | 74/665 Q |
| 4,281,560 | A * | 8/1981 | Herscovici | 74/414 |
| 4,571,215 | A * | 2/1986 | Hansen | 464/180 |
| 5,092,432 | A * | 3/1992 | Taig | 188/72.3 |
| 5,186,692 | A * | 2/1993 | Gleasman et al. | 475/82 |
| 5,650,684 | A * | 7/1997 | Suganuma | 310/261 |
| 6,026,909 | A * | 2/2000 | Hon | 173/162.1 |
| 2004/0043821 | A1* | 3/2004 | Ushimaru | 464/181 |

* cited by examiner

*Primary Examiner*—David J. Bagnett
*Assistant Examiner*—Shane Bomar
(74) *Attorney, Agent, or Firm*—Drinker Biddle & Reath LLP

(57) ABSTRACT

A blast-hole drilling rig includes a carriage, a mast disposed on the carriage, and a rotary head mounted on the mast for up-and-down movement. The rotary head includes: a housing forming an internal chamber, a hydraulically driven motor, and a rotation transmission mechanism disposed in the chamber. The rotation transmission mechanism includes a gear system having a high-speed power input section operably connected to the motor, and a low-speed power output section adapted for connection to a drill pipe. The rotation transmission mechanism includes an anti-vibrational inertial body forming part of the high-speed power input section for storing rotational energy to even-out rotary speed variations and resist the generation of vibrations during operation. The inertial body includes a downwardly open recess in which the motor casing extends, wherein the motor projects downwardly past a bottom wall of the housing.

17 Claims, 4 Drawing Sheets

FIG. 3
(PRIOR ART)
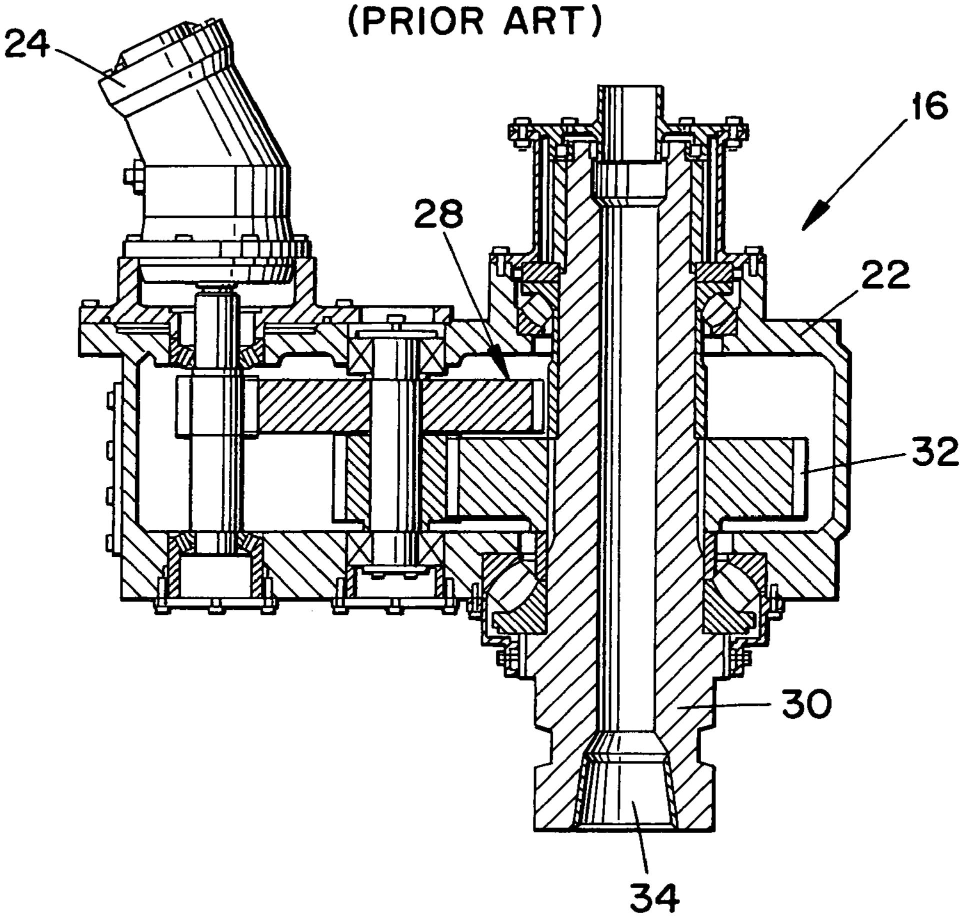
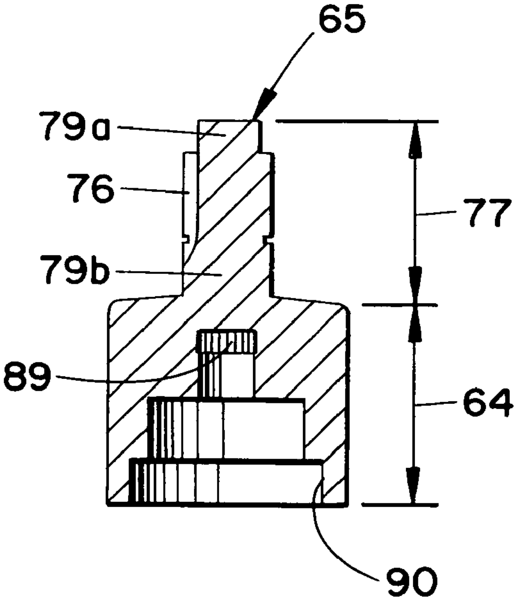
FIG. 8

FIG. 4
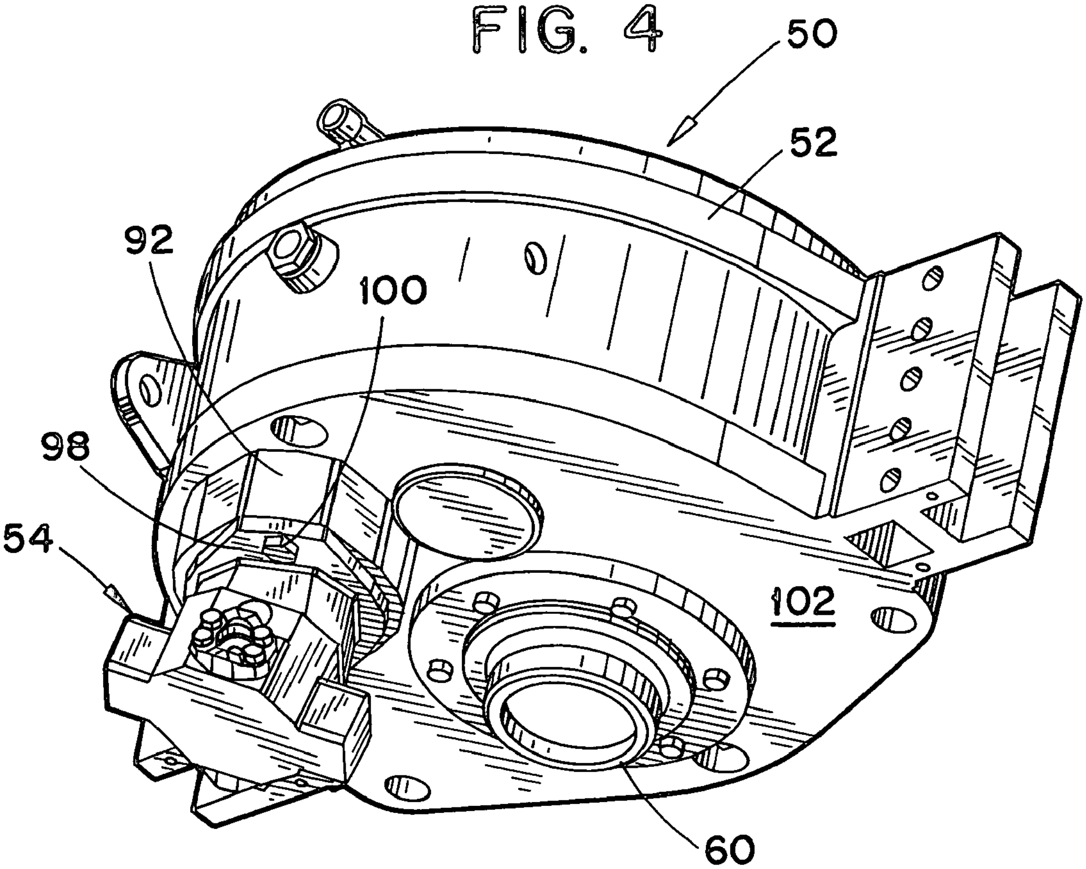
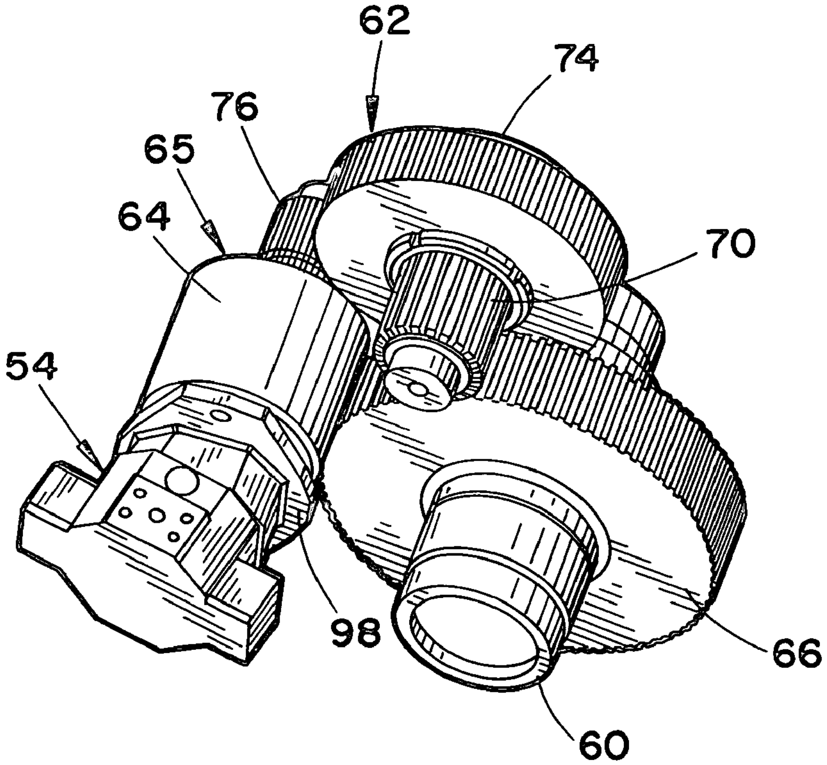
FIG. 5

FIG. 6
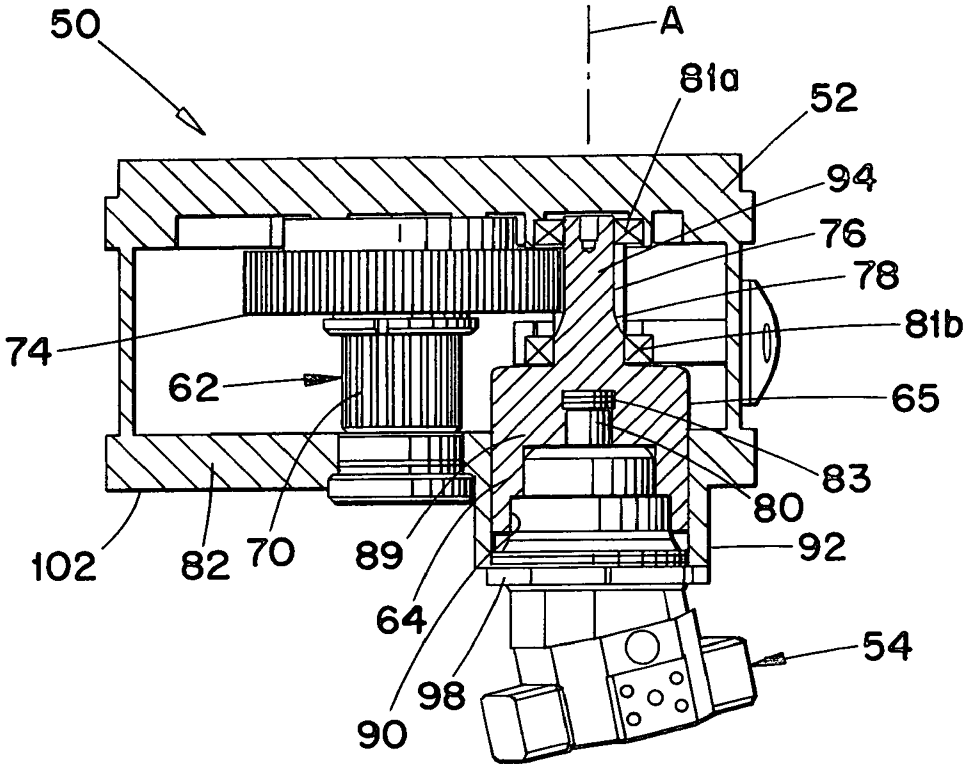
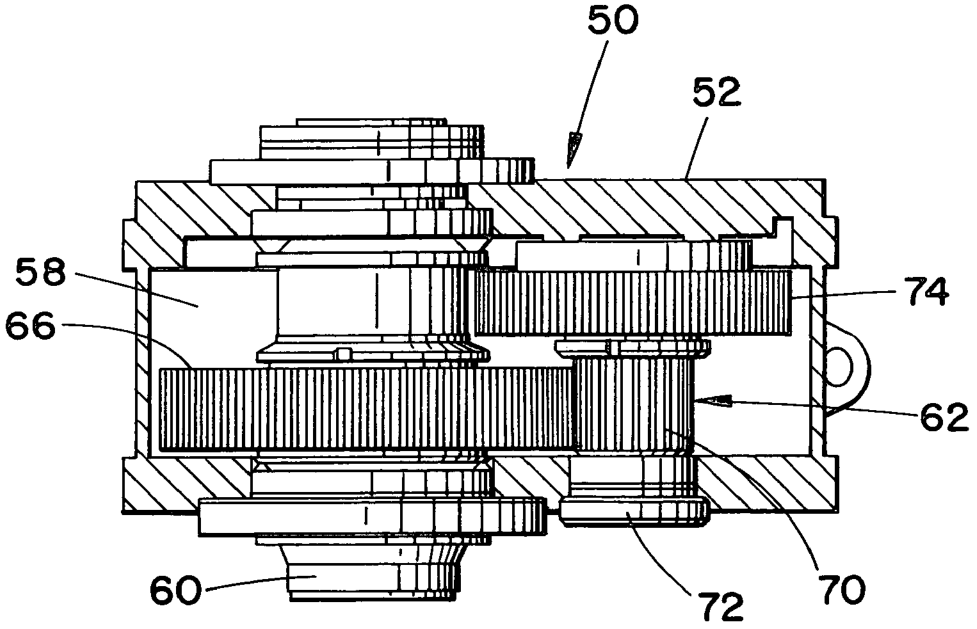
FIG. 7

DRILLING APPARATUS WITH ANTI-VIBRATION INERTIAL BODY

BACKGROUND OF THE INVENTION

The present invention relates to drilling in earth formations. More particularly, the invention relates to a rotation mechanism which employs a hydraulic motor to rotate a drill string during drilling. The drilling application may be for drilling water, oil, ground control-like piling operations, blast hole drilling, etc.

Basic drilling methods include "percussive" drilling and "rotary" drilling. The choice of drilling method is mainly dependent upon the physical and geological properties of the earth formation to be drilled. Hard rock formations generally require percussive drilling, while soft or non-consolidated rock may be suited to non-percussive rotary drilling.

In percussive drilling, percussion energy is generated by a reciprocating piston. With each piston impact from the piston, tungsten carbide buttons in the drill bit penetrate the rock surface. After each impact, the drill string is rotated to turn the drill bit to a new position as that the buttons strike fresh rock surfaces.

There are two types of percussive drilling, namely top hammer percussive drilling, wherein the percussion energy is applied by a piston to an upper end of the drill string, and down-the-hole percussive (DTH) drilling wherein the percussive energy is applied by a piston to a lower portion of the drill string, just above the bit. Top hammer drilling is generally used for drilling relatively small-diameter holes, e.g., 3–4 inches, whereas DTH drilling is generally used for drilling slightly larger-diameter holes, e.g., 4–6 inches.

Rotary drilling does not use percussion, but compensates by having increased feed force and rotation torque. The torque causes the bit to rotate, while the feed force holds the bit firmly against the ground. The combination of rotary torque and feed force enables the bit to produce chips by crushing and cutting. Rotary drilling is generally used for drilling holes greater than six inches in diameter.

A typical mobile drilling rig for performing blast-hole drilling (i.e., percussive or rotary) is depicted in FIG. 1. Blast-hole drilling is employed in the extraction of rock products and minerals from surface mines and quarries. A blast-hole drill produces holes according to a predetermined pattern and depth. The holes are charged with explosive, and the rock/minerals are blasted and broken for simplified recovery. The drilling rig comprises a mobile carriage 12 on which a mast 14 is supported. The mast carries a rotary head 16 which is capable of rotating a drill string 18 to which a drill bit 20 is mounted. The rotary head 16 can be raised and lowered by a hydraulically driven up-down feed system, e.g., a chain mechanism, to enable pipes to be removed from, or added to, the drill string.

A conventional rotary head 16, depicted in FIGS. 2–3, includes a housing 22, a hydraulic motor 24 mounted on a top side of the housing, and a rotation transmission mechanism carried within the housing for transmitting rotation from the motor to the drill string. The rotation transmission mechanism includes a speed reduction gear system 28 connected to the motor, and a bull shaft 30 connected to the gear system for outputting rotation to the drill string.

The gear system can be of any suitable configuration for performing a speed-reducing function. The bull shaft 30 is suitably splined to a bull gear 32 of the gear system to be rotated thereby about a vertical axis. An upper drill pipe of the drill string would be connected to a lower end 34 of the bull shaft.

The motor 24 is typically a piston-type hydraulic motor mounted on a top side of the housing 22. Hydraulic cylinders and roller chains, or cables (not shown) function to raise and lower the rotary head, which is secured to the mast with adjustable wear pieces (guide shoes).

As the drill string advances, during percussive or rotary drilling operations, it alternately encounters harder and softer rock formations, as well as cracks and voids in the rock formations. Thus, the resistance to rotation of the drill string is frequently changing, causing the drill string rotation to accelerate and decelerate. As a result of flexibility in the drill pipes, the mast 14 and the undercarriage 12, the repeated acceleration/deceleration of the drill string tends to produce heavy vibrations which can lead to premature wear and failure of the parts being vibrated, as well as creating discomfort for the operating personnel. To deal with that problem, it is often necessary to reduce the speed of rotation and drilling in order to limit the vibration magnitude, but that undesirably reduces the rate of penetration of the drill string through the earth formation.

While those problems occur in both percussive and rotary drilling methods, they are especially evident in rotary drilling where the torque and rotary speeds are much greater than in percussive drilling and thus result in stronger vibrations.

In all drilling applications, the frequent acceleration and de-acceleration cause premature drill bit and drill string damage as well as premature structural failures on the drill rig.

It would, therefore, be desirable to minimize vibrations during drilling (rotary or percussive) without having to appreciably reduce the rate of penetration. It would also be desirable to achieve that result in a relatively economical way.

SUMMARY OF THE INVENTION

The invention relates to a drilling apparatus which comprises a carriage, a mast disposed on the carriage, and a rotary head mounted on the mast for up-and-down movement. The rotary head comprises a housing forming an interior chamber, a hydraulically driven motor, and a rotation transmission mechanism disposed in the chamber. The rotation transmission mechanism includes a gear system having a high-speed power input section operably connected to the motor, and a low-speed power output section adapted for connection to a drill pipe. The rotation transmission mechanism further includes an anti-vibrational inertial body forming part of the high-speed power input section for storing rotational energy to even-out rotary speed variations and resist the generation of vibration during drilling operations.

Preferably, the anti-vibrational inertial body is integral with a high-speed gear of the power input section.

The inertial body preferably includes a downwardly open recess in which a casing of the motor is disposed.

BRIEF DESCRIPTION OF THE DRAWINGS

The objects and advantages of the invention will become apparent from the following detailed description of preferred embodiments thereof in connection with the accompanying drawings in which like numerals designate like elements.

FIG. 3 is a vertical sectional view taken through the prior art rotary head of FIG. 2.

FIG. 4 is a bottom perspective view of a rotary head according to the present invention.

FIG. 5 is a schematic perspective view of a speed reduction gear system in the rotary head according to the present invention.

FIG. 6 is a vertical sectional view taken through the rotary head of FIG. 4.

FIG. 7 is a vertical sectional view taken through the rotary head of FIG. 4 at a location spaced angularly from the FIG. 6 section.

FIG. 8 is a sectional view taken through a high-speed gear/inertia body according to the present invention.

DESCRIPTION OF A PREFERRED EMBODIMENT OF THE INVENTION

Figure 1:
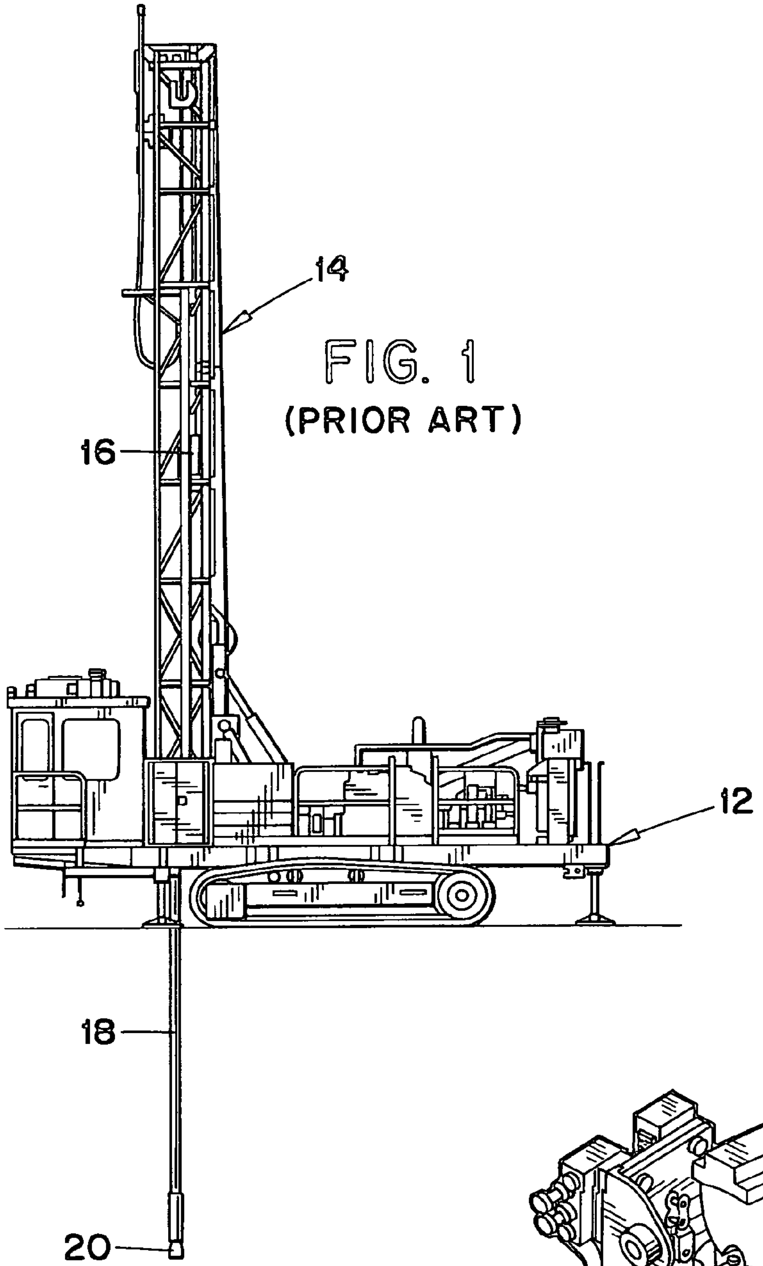
FIG. 1 (PRIOR ART)
FIG. 1 is a side elevational view of a blast-hole rotary drilling rig according to the prior art.
Figure 2:
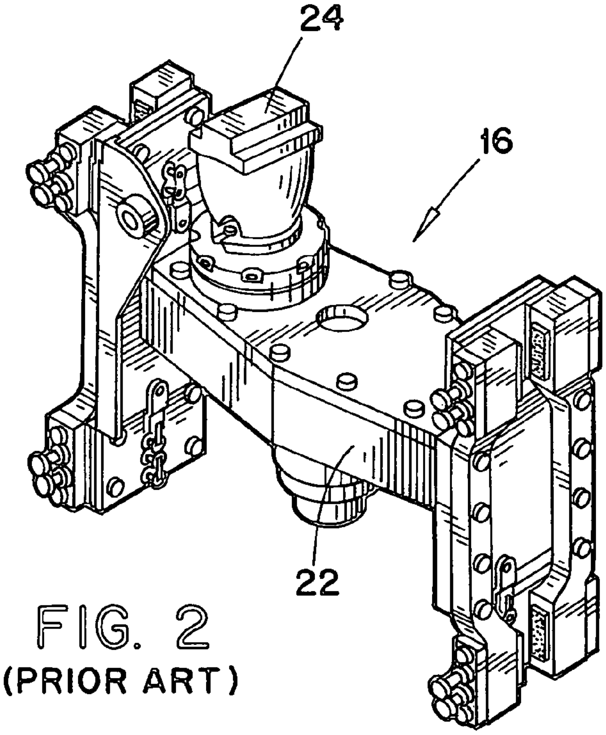
FIG. 2 (PRIOR ART)
FIG. 2 is a top perspective view of a prior art rotary head.

Depicted in FIGS. 4–8 is a rotary head 50 which can be mounted on any suitable rotary drilling rig, such as the blast hole rig described earlier in connection with FIG. 1. The rotary head 50 comprises a housing 52, a hydraulic motor 54 mounted to the housing, and a rotation transmission mechanism disposed in a chamber 58 formed by the housing, for transmitting rotation from the motor to a drill pipe of the drill string 18.

The rotation transmission mechanism includes a bull shaft 60 for outputting the rotation to the drill string, a speed reduction gear system 62 for transmitting rotation to the bull shaft, and an anti-vibrational inertial body 64 operably connected to the gear system for storing kinetic energy during rotation in order to even-out rotary speed variations of the rotation mechanism and thereby at least resist, and possibly even eliminate, the generation of vibrations, as will be discussed.

The bull shaft 60 is of a conventional type and is mounted in suitable bearings for rotation about a vertical axis. Also, the bull shaft is keyed to a bull gear 66 of the gear system to be driven thereby.

The gear system further includes a first intermediate gear 70 meshing with the bull gear to drive the latter. The intermediate gear 70 is mounted on a shaft 72 to which a second intermediate gear 74 is fixed, the latter meshing with a high-speed gear 76 to be driven thereby. The high-speed gear 76 forms part of a unit 77 which also includes two shaft portions 79*a*, 79*b* that are secured in respective bearings 81*a*, 81*b* that are fixed in the housing 52. Moreover, the unit 77 is formed integrally with the inertial body 64 to define therewith a high-speed transmission member 65. Therefore, the high-speed gear 76 is fixed for common rotation with the inertial body 64 about an axis A. The unit 77 and the inertial body 64 are formed by machining a single piece of metal.

Alternatively, the inertial body and at least part of the unit 77 could comprise separate components that are coupled together by fasteners or welds.

It will be appreciated that the gears 74, 62 and the bull shaft 60 form a low-speed side of the rotation-transmission mechanism, and the unit 77 and the inertial body 64 form a high-speed side of the rotation-transmission mechanism.

An output shaft 80 of the motor has a gear teeth 83 meshing with gear teeth 89 of the inertial body 64 to rotate same. Accordingly, when the motor 54 is actuated, rotation is transmitted simultaneously to the inertial body 64 and the high-speed gear 76, and then sequentially to the gears 74, 62, 66 and the bull shaft 60.

The motor 54 is a conventional hydraulic motor, preferably of the piston type and projects downwardly from the underside of a bottom wall 82 of the housing 52.

Despite the presence of the inertial body 64, the size of the rotary head is minimized. In that regard, a base portion 89 of the inertial body projects into a passage 91 extending through the bottom wall 82 and is provided with a downwardly open recess 90 shaped complementarily to the upper portion of the motor casing (e.g., step-shaped) to enable the upper portion of the motor casing to be contained within the inertial body 64. Thus, the inertial body 64 would be insertable into the chamber 58 through an opening formed by a sleeve portion 92 of the housing, such that the unit 77 is received in the two rotary bearings 81*a*, 81*b*.

During assembly, the motor 54 is inserted through the sleeve portion 92 and is received in the recess 90 of the inertial body 64, with the gear teeth of the output shaft 80 of the motor meshing with the gear teeth 89 formed in the recess 90 (see FIG. 8). A flange 98 of the casing of the motor 54 is coupled to the sleeve by bolts 100 (see FIG. 4) The motor thus projects downwardly from a bottom side 102 of the housing as noted earlier.

The mass of the inertial body should be great enough that, during a drilling operation, the inertial body 64 has a kinetic energy greater than that of the unit 77, preferably at least two times as great, more preferably at least ten times as great, and most preferably at least thirty times as great. Therefore, during a blast-hole drilling operation (i.e., either percussive drilling or rotary drilling), the inertial body 64 stores enough kinetic energy, while rotating, to even-out the speed/torque variations in the drill string and provide an essentially constant speed/torque. That is, the kinetic energy of the inertial body 64 is a function of the mass of the inertial body times the square of its rotational speed. Thus, by locating the inertial body on the high speed side of the rotation-transmitting mechanism, the kinetic energy of the inertial body is considerable. For example, a typical drilling speed (low-speed) of the drill string is 200 rpm, with a motor speed (high speed) of 4000 rpm. Thus, the gear system defines a gear ratio of 1:20. That means that the kinetic energy of the anti-vibrational inertial body rotating at 4000 rpm is transferred to the drill string through the speed reduction gear system. The kinetic energy from the anti-vibration inertial body is multiplied 400 times (20×20) through the reduction gearing to the drill string that is rotating at 200 rpm. When that large kinetic energy is transferred to the drill string through the gear system, it will effectively even-out variations in speed/torque of the system, without sacrificing production rate.

Despite the creation of a high inertia mass for effectively evening-out the speed variations, the inertial body 64 does not produce a significant increase in the size of the rotary head, since the inertial body 64 is configured to contain a considerable portion of the motor casing. Thus, the vertical height of the rotary head is not changed, and no horizontal increase results, because the horizontal dimension of the inertial body occupies a portion of the internal chamber that would otherwise have been unoccupied.

Although the present invention has been described in connection with a preferred embodiment thereof, it will be appreciated by those skilled in the art that additions, deletions, modifications, and substitutions not specifically described may be made without departing from the spirit and scope of the invention as defined in the appended claims.

What is claimed is:

1. A drilling apparatus comprising:

a carriage;

a mast disposed on the carriage and carrying an up-down feed system; and a rotation mechanism adapted for rotating a drill string, the rotation mechanism mounted to the feed system for up-and-down movement, and comprising:

a housing forming an interior chamber, a hydraulically driven motor with a motor casing, and a rotation transmission mechanism disposed in the chamber and including a gear system having a high-speed power input section operably connected to the motor, and a low-speed power output section adapted for connection to a drill pipe section, wherein the rotation transmission mechanism further includes an anti-vibrational inertial body forming part of the high speed power input section for storing rotational energy to even-out rotary speed variations and resist the generation of vibrations during drilling operations, wherein the anti-vibrational inertial body and a high-speed gear of the power input section are both formed by the same piece of material, and wherein the inertial body at least partially encloses a portion of the motor casing.

2. The drilling apparatus according to claim 1, wherein an output shaft of the hydraulically driven motor has gear teeth that mesh with gear teeth formed in the inertial body.

3. A drilling apparatus comprising:

a carriage;

a mast disposed on the carriage and carrying an up-down feed system; and a rotation mechanism adapted for rotating a drill string, the rotation mechanism mounted to the feed system for up-and-down movement, and comprising:

a housing forming an interior chamber, a hydraulically driven motor, and a rotation transmission mechanism disposed in the chamber and including a gear system having a high-speed power input section operably connected to the motor, and a low-speed power output section adapted for connection to a drill pipe section, wherein the rotation transmission mechanism further includes an anti-vibrational inertial body forming part of the high speed power input section for storing rotational energy to even-out rotary speed variations and resist the generation of vibrations during drilling operations, wherein the anti-vibrational inertial body and a high-speed gear of the power input section are both formed by the same piece of material, and wherein the inertial body includes a recess in which a casing of the motor is disposed.

4. The drilling apparatus according to claim 3 wherein the recess includes gear teeth meshing with gear teeth of an output shaft of the motor.

5. The drilling apparatus according to claim 3 wherein the housing includes a downwardly facing bottom wall through which a passage extends, the portion of the inertial body forming the recess being situated within the passage, the recess being downwardly open wherein the motor projects downwardly past the bottom wall.

6. A drilling apparatus comprising:

a carriage:

a mast disposed on the carriage and carrying an up-down feed system: and a rotation mechanism adapted for rotating a drill string, the rotation mechanism mounted to the feed system for up-and-down movement, and comprising:

a housing forming an interior chamber, a hydraulically driven motor, and a rotation transmission mechanism disposed in the chamber and including a gear system having a high-speed power input section operably connected to the motor, and a low-speed power output section adapted for connection to a drill pipe section, wherein the rotation transmission mechanism further includes an anti-vibrational inertial body forming part of the high speed power input section for storing rotational energy to even-out rotary speed variations and resist the generation of vibrations during drilling operations, wherein the anti-vibrational inertial body and a high-speed gear of the power input section are both formed by the same piece of material, wherein the high-speed power input section includes a unit comprised of a high-speed gear and first and second coaxial shaft portions connected to respective opposite sides of the high speed gear and mounted in respective bearings; the inertial body connected to one of the shaft portions, wherein the unit and the inertial body rotate at the same speeds, wherein the inertial mass of the inertial body is greater than that of the unit, and wherein the inertial body includes a recess, the motor including an outer casing projecting into the recess.

7. The drilling apparatus according to claim 6 wherein the inertial mass of the inertial body is at least twice as great as that of the unit.

8. The drilling apparatus according to claim 6 wherein the inertial mass of the inertial body is at least ten times as great as that of the unit.

9. The drilling apparatus according to claim 6 wherein the inertial mass of the inertial body is at least thirty times as great as that of the unit.

10. The drilling apparatus according to claim 6 wherein the unit and the inertial body are integrally formed.

11. A drilling apparatus comprising:

a carriage;

a mast disposed on the carriage and carrying an up-down feed system; and a rotation mechanism adapted for rotating a drill string, the rotation mechanism mounted to the feed system for up-and-down movement, and comprising:

a housing forming an interior chamber and having a bottom side, a hydraulically driven motor projecting downwardly past the bottom side, and a rotation transmission mechanism disposed in the chamber and including a gear system having a high-speed power input section and a low-speed power output section adapted for connection to a drill pipe section, the high-speed power input section including:

a high-speed gear, two shafts projecting coaxially from respective opposite sides of the high-speed gear and mounted in respective bearings, and an anti-vibrational inertial body joined to one of the shafts for common rotation with the unit, the inertial body having an inertial mass greater than the combined inertial mass of the high-speed gear and the two shafts, wherein the inertial body includes a downwardly open recess in which a casing and drive shaft of the motor are inserted.

12. The blast-hole drilling apparatus according to claim 11 wherein the high-speed gear, the two shafts, and the inertial body are formed by the same piece of material.

13. A rotary mechanism adapted to transmit rotational movement, comprising:

a housing forming an interior chamber, the housing including a bottom wall through which a passage extends, the passage communicating with the chamber;

a rotation transmission mechanism disposed in the chamber and including a gear system having:

a high-speed power input section including an anti-vibrational inertial body for storing rotational energy, a portion of the inertial body disposed within the passage and including a generally downwardly open recess, and a low-speed power output section connected to the input section; and a hydraulically driven motor including a motor casing mounted in the recess of the inertial body, and operably connected to the high-speed power input section to drive that input section.

14. The rotary mechanism according to claim 13 wherein the hydraulic motor is connected to the inertial body to drive the input section through the inertial body.

15. The rotary mechanism according to claim 13 wherein the high-speed power input section includes a unit comprised of a high-speed gear and first and second coaxial shaft portions connected to respective opposite sides of the high speed gear and mounted in respective bearings; the inertial body connected to one of the shaft portions, wherein the unit and the inertial body rotate at the same speed.

16. The rotary mechanism according to claim 15 wherein the inertial mass of the inertial body is at least ten times that of the unit.

17. The rotary mechanism according to claim 15 wherein the inertial mass of the inertial body is at least thirty times that of the unit.

* * * * *